(12) United States Patent
Okayama et al.

(10) Patent No.: US 6,537,385 B2
(45) Date of Patent: Mar. 25, 2003

(54) RARE EARTH MAGNET AND METHOD FOR MANUFACTURING THE SAME

(75) Inventors: Katsumi Okayama, Kusatsu (JP); Naoyuki Ishigaki, Otsu (JP); Shuhei Okumura, Osaka (JP)

(73) Assignee: Sumitomo Special Metals Co., Ltd. (JP)

( * ) Notice: Subject to any disclaimer, the term of this patent is extended or adjusted under 35 U.S.C. 154(b) by 0 days.

(21) Appl. No.: 10/190,733

(22) Filed: Jul. 9, 2002

(65) Prior Publication Data

US 2003/0000600 A1 Jan. 2, 2003

Related U.S. Application Data

(62) Division of application No. 09/851,423, filed on May 9, 2001.

(30) Foreign Application Priority Data

May 9, 2000 (JP) ........................................ 2000-136277
Jun. 30, 2000 (JP) ........................................ 2000-198508

(51) Int. Cl.[7] ............................................. H01F 1/057
(52) U.S. Cl. ........................... 148/101; 209/8; 209/214; 209/215; 241/24; 241/79.1; 419/30; 419/33
(58) Field of Search .............................. 148/101; 209/8, 209/212, 214, 215; 241/24, 79.1; 419/30, 33

(56) References Cited

U.S. PATENT DOCUMENTS

| | | | | |
|---|---|---|---|---|
| 4,214,984 A | * | 7/1980 | MacElvain | 209/214 |
| 4,834,811 A | * | 5/1989 | Keem et al. | 148/101 |
| 4,898,625 A | * | 2/1990 | Otsuka et al. | 148/101 |
| 4,968,529 A | * | 11/1990 | Hamamura et al. | 148/101 |
| 5,116,434 A | * | 5/1992 | Keem et al. | 148/101 |
| 5,788,782 A |   | 8/1998 | Kaneko et al. | |

FOREIGN PATENT DOCUMENTS

| | | | |
|---|---|---|---|
| EP | 0 295 779 A3 | 12/1988 | |
| EP | 0 651 401 A1 | 5/1995 | |
| JP | 63-116404 A | 5/1988 | |
| JP | 2-3203 | * 1/1990 | .............. 148/101 |
| JP | 04-114409 A | 4/1992 | |
| JP | 63-033505 A | 2/1998 | |
| JP | 10-233306 A | 9/1998 | |
| JP | 2000-219942 A | 8/2000 | |
| JP | 2000-219943 A | 8/2000 | |

OTHER PUBLICATIONS

Kaneko et al., "Recent Developments of High–Performance Neomax Magnets", pp. 228–233, Apr. 1994, Journal of Materials Engineering and Performance, vol. 3 (2).

Notice of Reasons of Rejection, Mailing No. 043488, Mailing Date: Feb. 19, 2001, Patent Application No.: 2000–198508.

Bernardi et al., "Microstructural Analysis of Strip Cast Nd–Fe–B Alloys for High (BH) max Magnets", pp. 6396–6398, Jun. 1, 1998, Journal of Applied Physics, vol. 83, No. 11.

European Search Report, Dated Jun. 22, 2001.

* cited by examiner

*Primary Examiner*—John P Sheehan
(74) *Attorney, Agent, or Firm*—Nixon Peabody LLP; Jeffrey L. Costellia

(57) ABSTRACT

The method for manufacturing alloy powder for R—Fe—B type rare earth magnets of the present invention includes a first pulverization step of coarsely pulverizing a material alloy for rare earth magnets and a second pulverization step of finely pulverizing the material alloy. In the first pulverization step, the material alloy is pulverized by a hydrogen pulverization method. In the second pulverization step, easily oxidized super-fine powder (particle size: 1.0 $\mu$m or less) is removed to adjust the particle quantity of the super-fine powder to 10% or less of the particle quantity of the entire powder.

11 Claims, 3 Drawing Sheets

RARE EARTH MAGNET AND METHOD FOR MANUFACTURING THE SAME

BACKGROUND OF THE INVENTION

The present invention relates to methods for manufacturing R—Fe—B type rare earth magnets, alloy powder for such magnets, and magnets produced by such methods.

Rare earth sintered magnets are produced by pulverizing an alloy for rare earth magnets to form alloy powder, compacting the alloy powder, and subjecting the alloy powder to sintering and aging. Presently, as the rare earth sintered magnets, two types of magnets, that is, samarium-cobalt magnets and neodymium-iron-boron magnets, are extensively used in various fields. In particular, neodymium-iron-boron magnets (hereinafter, referred to as "R—Fe—B type magnets", where R is any rare earth element and/or Y, Fe is iron, and B is boron), which exhibit the highest magnetic energy product among a variety of magnets and have a comparatively low cost, have been vigorously applied to various types of electronic equipment. Note that a transition metal element such as Co may substitute for part of Fe and C may substitute for part of B.

Powder of the material alloy for R—Fe—B type rare earth magnets may be produced by a method including a first pulverization process for coarsely pulverizing the material alloy and a second pulverization process for finely pulverizing the material alloy. In general, in the first pulverization process, the material alloy is coarsely pulverized to a size of the order of several hundred micrometers or less using a hydrogen embrittlement apparatus. In the second pulverization process, the coarsely pulverized alloy (coarsely pulverized powder) is finely pulverized to an average particle size of the order of several micrometers with a jet mill or the like.

The material alloy can be produced by methods largely classified into two types. The first type is an ingot casting method where a molten alloy is poured into a mold and cooled comparatively slowly. The second type is a rapid cooling method, typified by a strip casting method and a centrifugal casting method, where a molten material alloy is put into contact with a single chill roll, twin chill rolls, a rotary chill disk, a rotary cylindrical chill mold, or the like, to be rapidly cooled thereby producing a solidified alloy thinner than an ingot cast alloy.

In the rapid cooling method, the molten alloy is cooled at a rate in the range between $10^{2\circ}$ C./sec and $10^{4\circ}$ C./sec. The resultant alloy produced by the rapid cooling method has a thickness in the range between 0.03 mm and 10 mm. The molten alloy starts solidifying at the face that comes into contact with a chill roll. From the roll contact face, crystal grows in the thickness direction into the shape of pillars or needles. The resultant rapidly solidified alloy therefore has a fine crystal structure including portions of a $R_2T_{14}B$ crystal phase having a size in the range between 0.1 μm and 100 μm in the minor-axis direction and in the range between 5 μm and 500 μm in the major-axis direction, and portions of an R-rich phase dispersed at grain boundaries of the $R_2T_{14}B$ crystal phase portions. The R-rich phase is a non-magnetic phase in which the concentration of any rare earth element R is relatively high, and has a thickness (which corresponds to the width of the grain boundaries) of 10 μm or less.

Because the rapidly solidified alloy is cooled in a relatively short time compared with an ingot alloy produced by a conventional ingot casting method, the alloy has a fine structure and is small in grain size. In addition, with finely dispersed crystal grains, the area of grain boundaries is wide, and thus the R-rich phase spreads thinly over the grain boundaries. This results in good dispersion of the R-rich phase.

When a rare earth alloy (especially a rapidly solidified alloy) is coarsely pulverized in a hydrogen embrittlement process where the rare earth alloy first occludes hydrogen (this way of pulverization is herein called "hydrogen pulverization"), the R-rich phase portions existing at grain boundaries react with hydrogen and expand. This tends to cause the alloy to crack from the R-rich phase portions (grain boundary portions). Therefore, the R-rich phase tends to be exposed on the surfaces of particles of the rare earth alloy powder obtained by the hydrogen pulverization. In addition, in the case of a rapidly solidified alloy, where the R-rich phase portions are fine and highly dispersed, the R-rich phase particularly tends to be exposed on the surfaces of the hydrogen-pulverized powder.

According to experiments performed by the present inventors, when the coarsely pulverized powder in the above state is finely pulverized by a jet mill or the like, R-rich super-fine powder (fine powder having a particle size of 1 μm or less) is produced. Such R-rich super-fine powder particles oxidize very easily compared with other powder particles (having a relatively large particle size) that contain a relatively smaller amount of R. Therefore, if a sintered magnet is produced from the resultant finely pulverized powder without removing the R-rich super-fine powder, oxidation of the rare earth element vigorously proceeds during the manufacturing process steps. The rare earth element R is thus consumed for reacting with oxygen, and as a result, the production amount of the $R_2T_{14}B$ crystal phase as the major phase decreases. This results in reducing the coercive force and remanent flux density of the resultant magnet and deteriorating the squareness of the demagnetization curve, which is the second quadrant curve of the hysteresis loop.

In order to prevent oxidation of the R-rich finely pulverized powder, the entire process from pulverizing through sintering may ideally be performed in an inert atmosphere. It is however very difficult to realize this in a mass-production scale in production facilities.

There is proposed a method for solving the above problem, where fine pulverization is performed in an inert atmosphere containing a trace amount of oxygen, to intentionally coat the surfaces of finely pulverized powder particles with a thin oxide film to thereby suppress fast oxidation of the powder particles in the atmosphere.

However, the present inventors have found that the above method fails to sufficiently improve the final magnet properties and maintain the properties at the highest level, as long as the finely pulverized powder contains R-rich super-fine powder in a percentage equal to or more than a predetermined value.

An object of the present invention is to provide alloy powder for R—Fe—B type rare earth magnets capable of sufficiently improving and stabilizing the magnet properties.

Another object of the present invention is to provide alloy powder for R—Fe—B type rare earth magnets capable of sufficiently improving the final magnet properties and maintaining the properties at the highest level even when a material alloy including an R-rich phase is used and such a material alloy is coarsely pulverized by the hydrogen pulverization method.

SUMMARY OF THE INVENTION

The method for manufacturing alloy powder for R—Fe—B type rare earth magnets of the present invention includes a first pulverization step of coarsely pulverizing a material alloy for rare earth magnets and a second pulverization step of finely pulverizing the material alloy, wherein the first pulverization step comprises a step of pulverizing the material alloy by a hydrogen pulverization method, and the second pulverization step comprises a step of removing at least part of fine powder having a particle size of 1.0 μm or less to adjust the particle quantity of the fine powder having a particle size of 1.0 μm or less to 10% or less of the particle quantity of the entire powder.

In a preferred embodiment, the average concentration of the rare earth element contained in the fine powder having a particle size of 1.0 μm or less is greater than the average concentration of the rare earth element contained in the entire powder.

Alternatively, the method for manufacturing alloy powder for R—Fe—B type rare earth magnets of the present invention includes a first pulverization step of coarsely pulverizing a material alloy for rare earth magnets produced by a rapid cooling method and a second pulverization step of finely pulverizing the material alloy, wherein the second pulverization step comprises a step of removing at least part of powder in which the concentration of the rare earth element is greater than the average concentration of the rare earth element contained in the entire powder, to reduce the average concentration of oxygen bound with the rare earth element contained in the powder.

In the second pulverization step, the alloy is preferably finely pulverized using a high-speed flow of a gas.

Preferably, a predetermined amount of oxygen is contained in the gas. In this case, the concentration of the oxygen is preferably adjusted to be in the range between 0.05% and 3% by volume.

Plural types of rare earth alloys different in rare earth content may be used as the material alloy for rare earth magnets.

In an embodiment, the first pulverization step is performed separately for the plural types of rare earth alloys different in rare earth content, and the second pulverization step is performed one time together for the plural types of rare earth alloys different in rare earth content.

In another embodiment, the first and second pulverization steps are performed separately for the plural types of rare earth alloys different in rare earth content, and after the second pulverization step, the plural types of rare earth alloy powder are mixed together.

The alloys may be finely pulverized using a jet mill.

In a preferred embodiment, a classifier is provided following the jet mill for classifying powder output from the jet mill.

In a preferred embodiment, the material alloy for rare earth magnets is obtained by cooling a molten material alloy at a cooling rate in a range between $10^{2°}$ C./sec and $10^{4°}$ C./sec.

The molten material alloy is preferably cooled by a strip casting method.

In a preferred embodiment, the average particle size of the powder obtained in the first pulverization step is 200 to 1000 μm. When the material alloy for rare earth magnets is produced by a rapid cooling method, the average particle size of the powder is typically 500 μm or less.

The average particle size of the powder obtained in the second pulverization step is preferably in a range between 2 μm and 10 μm.

Preferably, the method further includes the step of adding a lubricant to the powder obtained in the second pulverization step.

The method for manufacturing an R—Fe—B type rare earth magnet of the present invention includes the steps of: preparing alloy powder for R—Fe—B type rare earth magnets produced by any of the methods for manufacturing alloy powder for R—Fe—B type rare earth magnets described above; and compacting the alloy powder for R—Fe—B type rare earth magnets to produce a permanent magnet.

Alternatively, the method for manufacturing an R—Fe—B type rare earth magnet of the present invention includes the steps of: preparing first alloy powder for R—Fe—B type rare earth magnets produced by any of the methods for manufacturing alloy powder for R—Fe—B type rare earth magnets described above; preparing second alloy powder for R—Fe—B type rare earth magnets different from the first alloy powder in rare earth content; forming mixed powder by mixing the first alloy powder and the second alloy powder; compacting the mixed powder to produce a compact; and sintering the compact to produce a permanent magnet.

The alloy powder for R—Fe—B type rare earth magnets of the present invention has an average particle size in a range of 2 μm and 10 μm, and the particle quantity of fine powder having a particle size of 1.0 μm or less is adjusted to 10% or less of the particle quantity of the entire powder.

In a preferred embodiment, the alloy powder is obtained by cooling a molten material alloy at a cooling rate in a range between $10^{2°}$ C./sec and $10^{4°}$ C./sec and pulverizing the resultant alloy.

The R—Fe—B type rare earth magnet of the present invention is produced from the alloy powder for R—Fe—B type rare earth magnets described above.

DETAILED DESCRIPTION OF THE INVENTION

Figure 1:
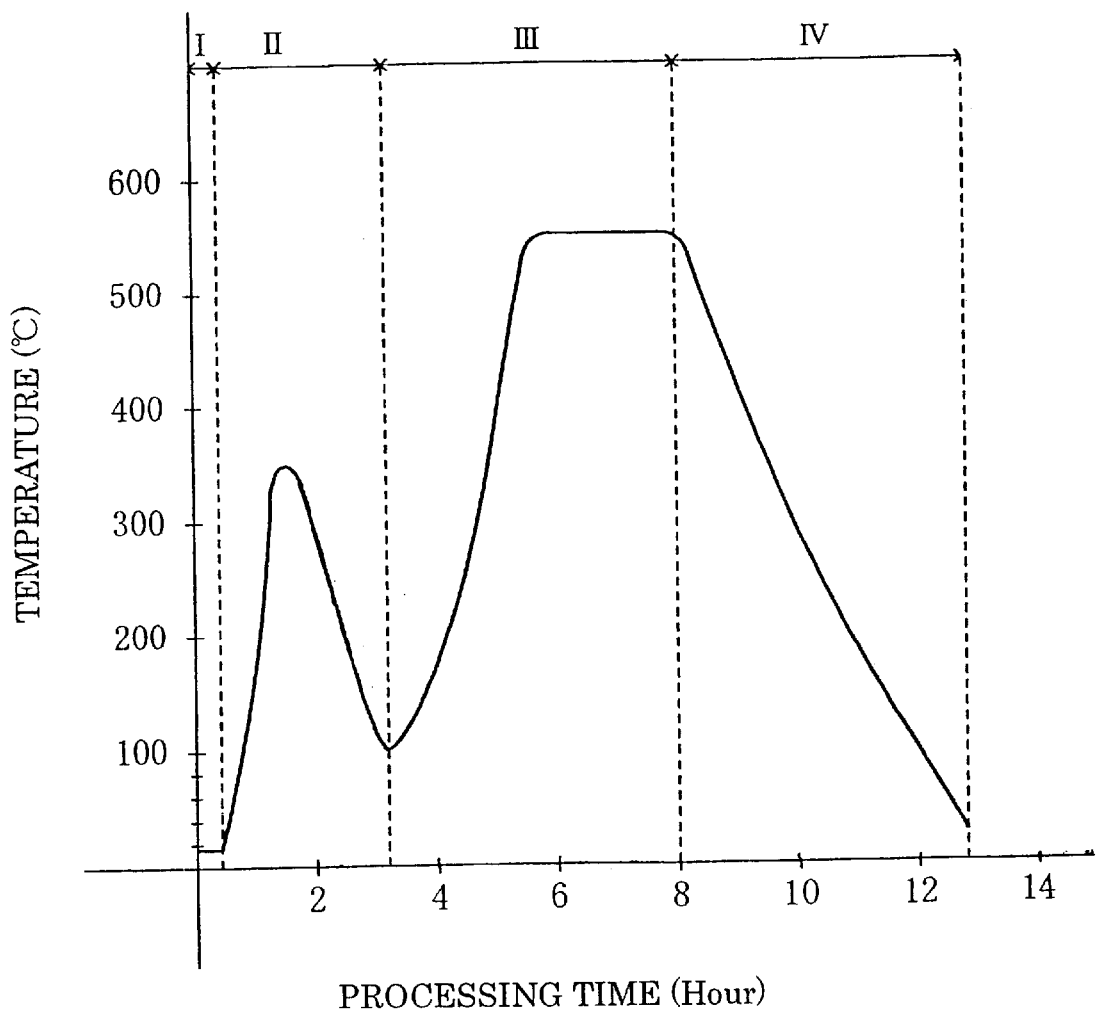
FIG. 1 is a graph showing an exemplary temperature profile in the hydrogen pulverization performed in the rough pulverization process according to the present invention.

The present invention was attained based on the findings by the present inventors that if alloy powder for R—Fe—B type rare earth magnets contains R-rich super-fine powder having a particle size of 1 μm or less in excess of a predetermined percentage, the magnet properties of permanent magnets produced by sintering a compact made of such alloy powder are deteriorated.

In the method according to the present invention, after a material alloy for rare earth magnets is coarsely pulverized and before a fine pulverization step is finished, at least part of R-rich super-fine powder, i.e., powder having a particle size of 1 μm or less, is removed to adjust the particle quantity of the R-rich super-fine powder to 10% or less of the particle quantity of the entire powder. The rare earth element R contained in the R-rich super-fine powder has the concentration of 38 wt % or more, which is higher than the average concentration of R contained in the entire powder. Therefore, the removal of part of the R-rich super-fine powder can reduce the concentration of R contained in the entire powder. Reduction in the concentration of the rare earth element R might appear disadvantageous at first glance, since the rare earth element R is indispensable for the $R_2T_{14}B$ crystal phase as the major phase providing hard magnetism. However, the rare earth element R contained in the super-fine powder removed will otherwise be consumed for reacting with oxygen and will not significantly contribute to generation of the $R_2T_{14}B$ crystal phase. Therefore, by removing the R-rich super-fine powder, the amount of oxygen contained in the entire powder can eventually be reduced. This results in rather increasing the amount of the $R_2T_{14}B$ crystal phase contained in the resultant sintered magnet, and thus improves the magnetic properties of the magnet.

According to experiments by the present inventors, R-rich super-fine powder is apt to be produced when a rapidly solidified alloy such as a strip cast alloy is pulverized and when the hydrogen pulverization method is employed for coarse pulverization, as described above. Therefore, in an exemplary embodiment of the present invention to be described hereinafter, a rapidly solidified alloy is coarsely pulverized by the hydrogen pulverization method and then finely pulverized. In addition, when a jet mill is used to perform fine pulverization under a high-speed flow of inert gas, a gas flow classifier using centrifugal force may be provided following the jet mill to enable effective removal of R-rich super-fine powder (particle size: 1 $\mu$m or less) from finely pulverized powder carried in the gas flow. In the following embodiment, therefore, a jet mill is used for fine pulverization.

Hereinafter, the embodiment of the present invention will be described with reference to the accompanying drawings.

Material Alloy

First, a material alloy for R—Fe—B magnets having a desired composition is prepared by a known strip casting method and stored in a container. Specifically, an alloy having a composition of 30.8 wt % (atomic percent) of Nd, 3.8 wt % of Pr, 0.8 w % of Dy, 1.0 wt % of B, 0.9 wt % of Co, 0.23 wt % of Al, 0.10 wt % of Cu, and Fe as balance with inevitably contained impurities is melted by high-frequency melting, to form a molten alloy. The molten alloy is kept at 1350 and then cooled by a single chill roll method, to obtain alloy strips or flakes having a thickness of about 0.3 mm. The cooling process is performed under the conditions of a roll circumferential velocity of about 1 m/sec, a cooling rate of 500 ° C./sec, and subcooling to 200 ° C. The thus-produced rapidly solidified alloy is crushed to smaller flakes having a size of 1 to 10 mm before being subjected to hydrogen pulverization. Production of a material alloy by the strip casting method is disclosed in U.S. Pat. No. 5,383,978, for example.

First Pulverization Process

The coarsely crushed material alloy flakes are then filled in a plurality of material packs made of stainless steel, the packs are put on a rack, and the rack is placed in a hydrogen furnace. The hydrogen furnace is then covered with a lid to start the hydrogen pulverization process, according to a temperature profile shown in FIG. 1, for example. In the example shown in FIG. 1, an evacuation step I is first executed for 0.5 hours, followed by a hydrogen occlusion step II for 2.5 hours. In the hydrogen occlusion step II, hydrogen gas is fed into the furnace to produce a hydrogen atmosphere inside the furnace. The hydrogen pressure at this time is preferably about 200 to 400 kPa.

Subsequently, a dehydrogenation step III is executed under a reduced pressure of 0 to 3 Pa for 5.0 hours, and then a material alloy cooling step IV is performed for 5.0 hours while feeding argon gas into the furnace.

From the aspect of cooling efficiency, the cooling step IV is preferably performed in the following manner. When the temperature of the atmosphere in the furnace is still comparatively high in the cooling step IV (for example, when it is more than 100 ° C.), the inert gas having an ordinary temperature is fed into the furnace for cooling. When the temperature of the material alloy drops to a comparatively low level (for example, when it is 100° C. or less), the inert gas cooled to a temperature lower than the ordinary temperature (for example, a temperature lower than room temperature by about 10 ° C.) is fed into the furnace. Argon gas may be fed at a volume flow rate of about 10 to 100 m³ per minute.

Once the temperature of the material alloy drops to as low as about 20 to 25° C., the inert gas having roughly a temperature within about 5° C. of room temperature is fed into the hydrogen furnace until the temperature of the material alloy reaches the ordinary temperature level. By following the above procedure, it is possible to avoid occurrence of condensation inside the furnace when the lid of the hydrogen furnace is opened. If water exists inside the furnace due to condensation, the water will be frozen/vaporized in the evacuation step. This makes it difficult to increase the degree of vacuum and thus disadvantageously increases the time required for the evacuation step I.

After the hydrogen pulverization, the coarsely pulverized alloy powder should preferably be taken out from the hydrogen furnace in an inert gas atmosphere so as not to be in contact with the atmosphere. This prevents oxidation/heat generation of the coarsely pulverized powder and thus serves to improve the magnetic properties of the resultant magnet. The coarsely pulverized material alloy is then filled in a plurality of material packs, and the packs are put on a rack. Any apparatus and methods for the hydrogen pulverization described in U.S. Pat. No. 6,403,024, which is incorporated herein by reference, are useful in the present invention.

By the hydrogen pulverization, the rare earth alloy is pulverized to a size in the range between about 0.1 mm and several millimeters with an average particle size of 200 to 1000 $\mu$m. After the hydrogen pulverization, the embrittled material alloy is preferably further cracked to a finer size and cooled with a cooling apparatus such as a rotary cooler. In the case of taking out the material while the temperature of the material is still comparatively high, the cooling time with the rotary cooler or the like may be made relatively longer.

Second Pulverization Process

Next, the coarsely pulverized powder produced in the first pulverization process is finely pulverized (or milled) with a jet mill. To the jet mill used in this embodiment, a cyclone classifier is connected for removal of fine powder.

Hereinafter, the fine pulverization process (second pulverization process) using the jet mill will be described in detail with reference to FIG. 2.

The illustrated jet mill unit denoted by the reference numeral 10 includes: a material feeder 12 for feeding the rare earth alloy coarsely pulverized in the first pulverization process; a pulverizer 14 for pulverizing the material to be pulverized fed from the material feeder 12; a cyclone classifier 16 for classifying powder obtained by pulverizing the material to be pulverized with the pulverizer 14; and a collecting tank 18 for collecting powder having a predetermined particle size distribution classified with the cyclone classifier 16.

The material feeder 12 includes a material tank 20 for receiving the material to be pulverized, a motor 22 for controlling the feed amount of the material to be pulverized from the material tank 20, and a spiral screw feeder 24 connected to the motor 22.

The pulverizer 14 includes a vertically-mounted roughly cylindrical pulverizer body 26. In the bottom portion of the pulverizer body 26, formed are a plurality of nozzle fittings 28 for receiving nozzles through which an inert gas (for example, nitrogen) is jet at high speed. A material feed pipe 30 is connected to the pulverizer body 26 at the sidewall thereof for feeding the material to be pulverized into the pulverizer body 26.

The material feed pipe 30 is provided with a pair of valves 32, composed of an upper valve 32a and a lower valve 32b, for holding the material to be fed temporarily and confining the pressure inside the pulverizer 14. The screw feeder 24 and the material feed pipe 30 are coupled with each other via a flexible pipe 34.

The pulverizer 14 also includes a classifying rotor 36 placed in the upper portion of the pulverizer body 26, a motor 38 placed outside the upper position of the pulverizer body 26, and a connection pipe 40 placed through the upper portion of the pulverizer body 26. The motor 38 drives the classifying rotor 36, and the connection pipe 40 discharges the powder classified with the classifying rotor 36 outside the pulverizer 14.

The pulverizer 14 includes a plurality of support legs 42, and is secured to a base 44 surrounding the pulverizer 14 with the legs 42 attached to the base 44. In this embodiment, weight detectors 46 such as load cells are placed between the legs 42 and the base 44. Based on the outputs from the weight detectors 46, a control section 48 controls the rotational speed of the motor 22 to thereby control the feed amount of the material to be pulverized.

The cyclone classifier 16 includes a classifier body 64 and an exhaust pipe 66 extending downward in the classifier body 64 from above. An inlet 68 is formed at the sidewall of the classifier body 64, to connect the classifier body 64 with the connection pipe 40 through a flexible pipe 70 for receiving the powder classified with the classifying rotor 36. An outlet 72 is formed at the bottom of the classifier body 64, to connect the classifier body 64 with the collection tank 18 for collection of desired finely pulverized powder.

The flexible pipes 34 and 70 are preferably made of resin or rubber, or made of a highly rigid material constructed in an accordion or coil shape to provide flexibility. By using such flexible pipes 34 and 70, changes in the weights of the material tank 20, the screw feeder 24, the classifier body 64, and the collecting tank 18 are not transferred to the legs 42. This makes it possible to correctly detect the weight of the material to be pulverized remaining in the pulverizer 14, as well as a change of the weight, with the weight detectors 46 placed on the legs 42.

Next, the pulverization with the jet mill 10 will be described.

First, the material to be pulverized is put into the material tank 20, for being fed to the pulverizer 14 through the screw feeder 24. The feed amount of the material to be pulverized can be regulated by controlling the rotational speed of the motor 22. The material fed from the screw feeder 24 is temporarily held at the valves 32. The upper and lower valves 32a and 32b open and close alternately. Specifically, when the upper valve 32a is open, the lower valve 32b is closed. When the upper valve 32a is closed, the lower valve 32b is open. By this alternate open/close operation of the pair of valves 32a and 32b, the pressure inside the pulverizer 14 is prevented from leaking to the material feeder 12. In this way, when the upper valve 32a is open, the material to be pulverized is held between the pair of upper and lower valves 32a and 32b, and when the lower valve 32b is open, the material to be pulverized is guided through the material feed pipe 30 to be introduced into the pulverizer 14. The valves 32 are driven at high speed with a sequence circuit (not shown) separate from the control circuit 48 so that the material to be pulverized is sequentially fed into the pulverizer 14.

The material to be pulverized fed into the pulverizer 14 is rolled up with high-speed jets of inert gas from the nozzle fittings 28 and swirl together with high-speed gas flows inside the pulverizer 14. While swirling, the particles of material are finely milled by mutual collision with each other.

Powder particles finely pulverized as described above are guided upward with ascending gas flows to reach the classifying rotor 36, where the particles are classified and coarse particles are dropped for further pulverization. Particles having a size of a desired value or less pass through the connection pipe 40 and the flexible pipe 70 to be introduced into the classifier body 64 of the cyclone classifier 16 via the inlet 68. Inside the classifier body 16, relatively large powder particles having a size of a predetermined value or more precipitate to be accumulated in the collecting tank 18 placed under the classifier body 64, while super-fine powder particles are discharged together with the inert gas flows through the exhaust pipe 66. In this embodiment, by removing the superfine powder through the exhaust pipe 66, the particle quantity of the super-fine powder (particle size of 1 $\mu$m or less) is adjusted to 10% or less of that of the entire powder collected in the collecting tank 18. By removing the R-rich super-fine powder in this manner, it is possible to reduce the amount of the rare earth element R in the resultant sintered magnet that is consumed for reacting with oxygen, and thus improve the magnet properties.

As described above, in this embodiment, the cyclone classifier 16 having the blowing-up function is used as the classifier following the jet mill (pulverizer 14). In the cyclone classifier 16 of this type, super-fine powder having a particle size of a predetermined value or less turns upward without being collected into the collecting tank 18 and is discharged outside through the pipe 66.

The particle size of the fine powder to be discharged through the pipe 66 can be controlled by appropriately determining cyclone parameters as those defined in "Powder technology pocketbook", Kogyo Chosakai Publishing Co., Ltd., pp. 92–96 and regulating the pressure of the inert gas flows.

Figure 3:
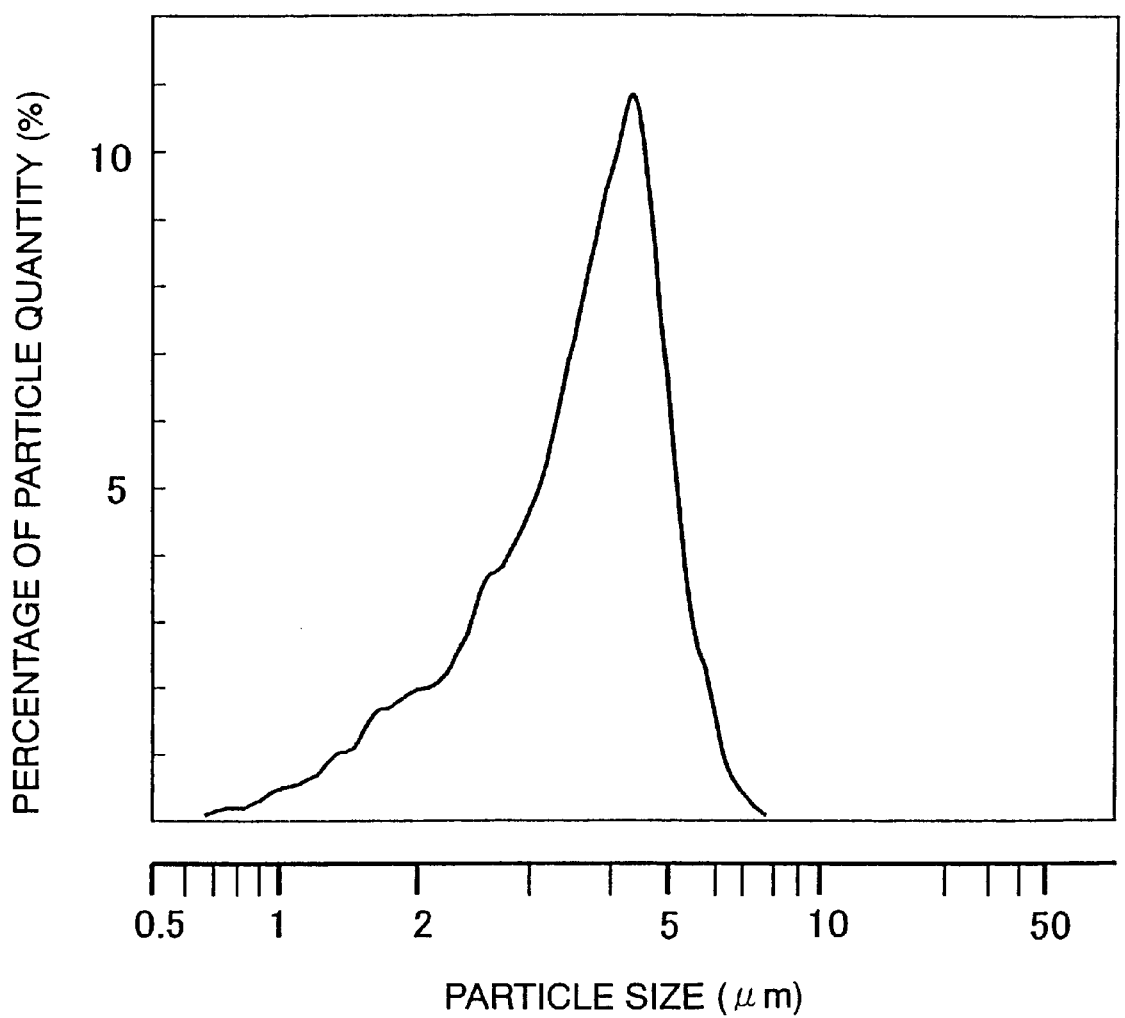
FIG. 3 is a graph showing a particle size distribution of the alloy powder for rare earth magnets of the present invention.

FIG. 3 shows an example of the particle size distribution of the powder obtained after the second pulverization process described above. As shown in FIG. 3, in this embodiment, it is possible to obtain alloy powder of which the average particle size is about 4.0 $\mu$m, for example, and in which the particle quantity of super-fine powder having a particle size of 1.0 $\mu$m or less is 10% or less of that of the entire powder. The preferred average particle size of finely pulverized powder used for manufacture of sintered magnets is in the range between 2 $\mu$m and 10 $\mu$m. Note that in the example shown in FIG. 3, since the material alloy used (strip cast alloy) had a fine metal structure, the resultant particle size distribution was significantly sharp compared with that of the conventional ingot alloy powder. In this embodiment, the pulverization condition is adjusted so that the particle quantity of coarse powder having a particle size of 5 μm or more should be 13% or less of that of the entire powder. Reduction in the amount of such large powder particle whose size is 5 μm or more improves the magnet properties of the resultant sintered magnet. In this specification, the "particle size" is defined by the particle dimension that is measured with a Fisher Sub-Siever Sizer (F.S.S.S.) method.

In order to minimize the oxidation in the pulverization process as much as possible, the oxygen amount in the high-speed flow gas used during the fine pulverization should preferably be reduced to about 0.02% to about 5% by volume. A pulverization method including control of the oxygen concentration in the high-speed flow gas is described in Japanese Patent Examined Publication No. 6-6728. More preferably, the oxygen amount in the inert gas may be adjusted to the range of 0.05% to 3% by volume.

By controlling the oxygen concentration in an atmosphere for fine pulverization as described above, the oxygen content of the finely pulverized alloy powder is preferably adjusted to 6,000 ppm by weight or less. If the oxygen content of the rare earth alloy powder exceeds 6,000 ppm by weight, the percentage of nonmagnetic oxides in the resultant sintered magnet increases, resulting in deteriorating the magnetic properties of the sintered magnet. The finely pulverized powder particles are coated with an oxide layer as described above. This permits compaction of the powder in the atmosphere.

In this embodiment, the control of the oxygen content of the powder to 6,000 ppm by weight or less is possible by regulating the oxygen concentration in the inert gas atmosphere during the fine pulverization because R-rich super-fine powder has been appropriately removed. If R-rich super-fine powder is not removed and thus the particle quantity of super-fine powder exceeds 10% of that of the entire powder, the oxygen content of the finally obtained powder will exceed 6,000 ppm even when the oxygen concentration in the inert gas atmosphere is reduced.

Thus, the removal of R-rich super-fine powder having a particle size of 1 μm or less provides the following effects. The flowability of the final powder obtained after the second pulverization process improves. The crystal grain size is made uniform after sintering. This improves the squareness of the B-H demagnetization curve and thus results in a high coercive force.

Figure 2:
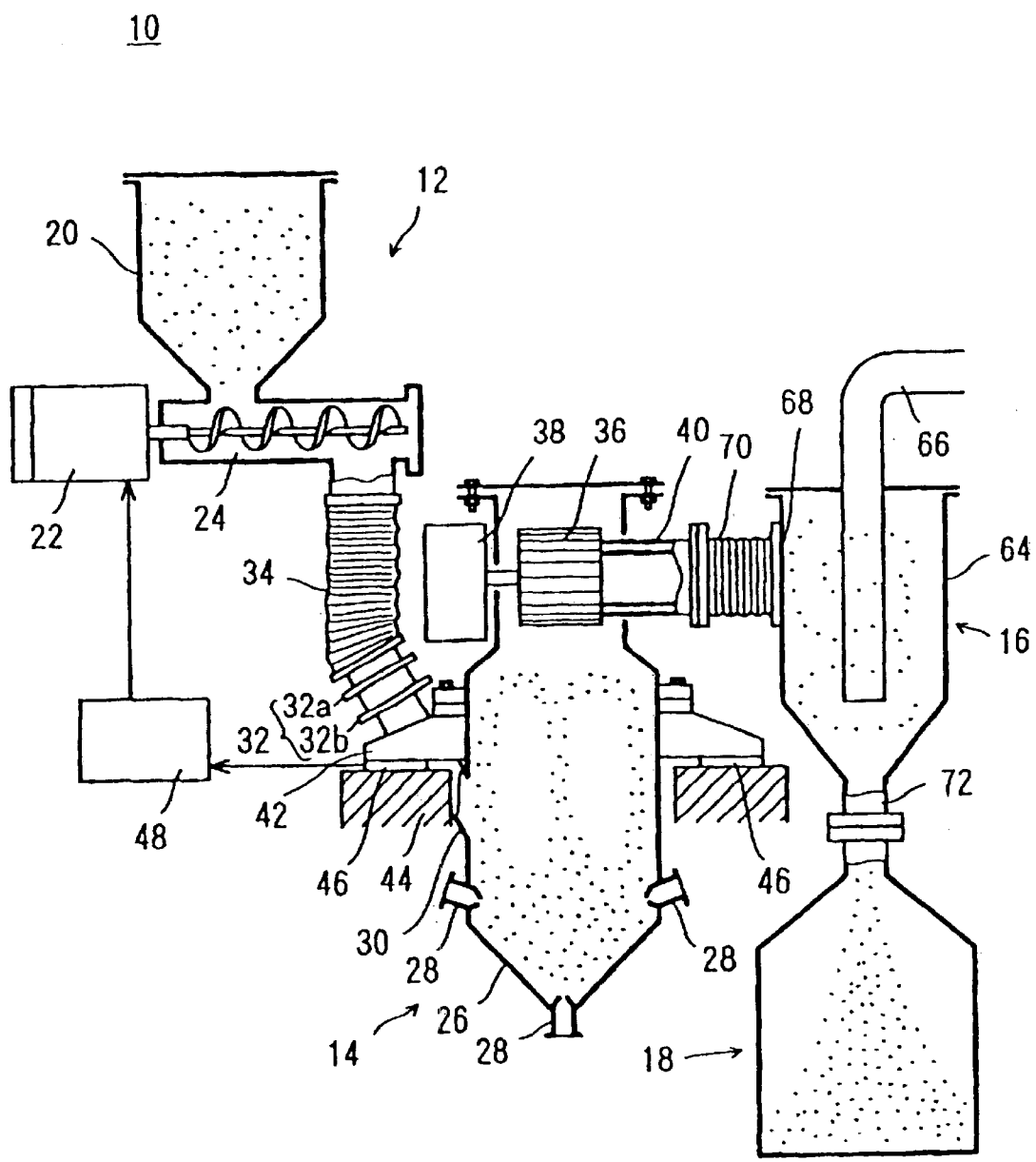
FIG. 2 is a cross-sectional view of the construction of a jet mill suitably used in the fine pulverization process according to the present invention.

In this embodiment, the second pulverization process is performed with the jet mill 10 constructed as shown in FIG. 2. The present invention is not limited to this, but a jet mill having another construction or another type of pulverizer (an attritor, a ball mill, or the like) may also be used. As the classifier for removing super-fine powder, a centrifugal classifier such as a FATONGEREN type classifier and a micro-separator may also be used in place of the cyclone classifier.

Addition of Lubricant

In this embodiment, the finely pulverized powder produced in the manner described above is mixed with a lubricant in an amount of 0.3 wt %, for example, in a rocking mixer, so that the alloy powder particles are coated with the lubricant. As the lubricant, a fatty ester diluted with a petroleum solvent may be used. In this embodiment, methyl caproate is used as the fatty ester and isoparaffin is used as the petroleum solvent. The weight ratio of methyl caproate to isoparaffin is set at 1:9, for example. Such a liquid lubricant provides the effect of protecting the powder particles from being oxidized by coating the surfaces of the particles, and the function of improving the degree of alignment of the powder particles during compaction and the degree of powder compaction (that is, forming a compact with a uniform density having no defects such as fractures and cracks).

The type of the lubricant is not limited to that described above. As the fatty ester, methyl caprylate, methyl laurylate, methyl laurate, and the like may be used in place of methyl caproate. As the solvent, petroleum solvents other than isoparaffin and naphthenic solvents may be used. The lubricant may be added at any timing before, during, or after the fine pulverization using the jet mill. In place of or in addition to the liquid lubricant, a solid (dry) lubricant such as zinc stearate may be used.

By coating the surfaces of the finely pulverized powder particles as described above, oxidation of the powder can be suppressed.

Compaction

The magnetic powder produced by the method described above is compacted in a magnetic field for alignment using a known press. Upon completion of compaction, a powder compact is pressed upward with a lower punch to be taken out from the press.

The compact is then placed on a sintering bedplate made of molybdenum, for example, and mounted in a sintering case together with the bedplate. The sintering case including the compact is moved to a sintering furnace, where the compact is subjected to a known sintering process to produce a sintered body. The sintered body is then subjected to aging, surface polishing, and deposition of a protection film, as required.

In this embodiment, since the powder to be compacted contains only a small amount of easily-oxidizing R-rich super-fine powder, heat generation and ignition due to oxidation are not likely to occur immediately after the compaction. Thus, the removal of R-rich super-fine powder contributes to, not only improvement in magnetic properties, but also improvement in safety.

Example and Comparative Example

As the example of the present invention, in the fine pulverization process using the jet mill and the cyclone classifier connected to each other, the pressure of the gas in the cyclone classifier was controlled to change the amount of super-fine powder contained in the collected powder. Nitrogen gas (99% by volume) with the addition of n gas (1% by volume) was used as a high-speed flow gas for the jet mill.

For samples 1 to 10, evaluated were the percentage of the particle quantity of super-fine powder having a particle size of 1 μm or less in the entire powder, the magnetic properties, and the oxygen amount. The results are shown in Table 1.

TABLE 1

| Sample No. | Percentage of super-fine powder (%) | IHc (kA/m) | Br (T) | Sinter density (g/cm$^3$) | Oxygen amount (ppm) |
|---|---|---|---|---|---|
| 1 | 0.5 | 1,009 | 1.42 | 7.65 | 2,900 |
| 2 | 1.0 | 1,003 | 1.42 | 7.60 | 3,050 |
| 3 | 3.0 | 1,003 | 1.41 | 7.65 | 3,200 |

TABLE 1-continued

| Sample No. | Percentage of super-fine powder (%) | IHc (kA/m) | Br (T) | Sinter density (g/cm³) | Oxygen amount (ppm) |
|---|---|---|---|---|---|
| 4 | 5.0 | 995 | 1.40 | 7.60 | 3,500 |
| 5 | 7.0 | 987 | 1.38 | 7.52 | 4,000 |
| 6 | 10.0 | 963 | 1.36 | 7.45 | 5,300 |
| 7 | 13.0 | 812 | 1.32 | 7.30 | 7,400 |
| 8 | 15.0 | 692 | 1.29 | 7.00 | 8,500 |

Note that samples 1 to 6 are examples of the present invention, while samples 7 and 8 are comparative examples. These samples were produced under the following conditions.

The powder prepared in the manner described in the above embodiment was compacted to produce compacts having a size of 15 mm×20 mm×10 mm. The pressure applied was 98 MPa. During compaction, a magnetic field (1.0 MA/m) for alignment was applied in the direction in which the thickness of the compact was 15 mm. After compaction, the compact was sintered in an argon atmosphere at a temperature of 1,100° C. for two hours. After aging was performed, the sintering density, the coercive force iHc of the sintered magnet, and the residual magnetic flux density Br were measured. Note that the oxygen amounts in Table 1 are those in the respective alloy powders measured after the fine pulverization.

As is observed from Table 1, the oxygen amount increases and the sintering density decreases with increase of the percentage of the particle quantity of super-fine powder having a particle size of 1 μm or less in the entire powder. As the percentage of the particle quantity of super-fine powder having a particle size of 1 μm or less increased beyond 10.0%, the oxygen amount exceeded 6,000 ppm by weight and the sintering density fell short of 7.4 g/cm³. In addition, both the coercive force iHc and the residual magnetic flux density Br deteriorated.

On the contrary, when the percentage of the particle quantity of super-fine powder having a particle size of 1 μm or less was 10.0% or less, it was possible to obtain excellent magnetic properties of a coercive force iHc of 900 kA/m or more and a residual magnetic flux density Br of 1.35 T or more. In particular, when the percentage of the particle quantity of the super-fine powder was 5.0% or less, better magnetic properties were obtained, where the coercive force iHc was as high as 990 kA/m or more and the residual magnetic flux density Br was as high as 1.4 T or more. Most of all, the best magnetic properties were obtained when the percentage of the particle quantity of the super-fine powder was 3.0% or less.

As described above, the oxygen amount in the pulverized powder can be reduced by reducing the percentage of R-rich super-fine powder existing in the rare earth alloy powder. With the reduced oxygen amount, the density of the sintered body can be sufficiently improved, and as a result, the magnetic properties can be greatly improved.

The rare earth alloy powder particles used in the present invention are ferromagnetic, and therefore tend to agglomerate together with a magnetic force, forming secondary aggregated particles or cohered particles. For this reason, the measurement results may not be correct when a conventional particle size distribution measurement method is employed. In this example, therefore, the particle size distribution was measured in the following manner.

A powder sample is put in a beaker together with ethyl alcohol and subjected to ultrasonic dispersion. After the supernatant in the beaker is removed, the resultant powder sample is kneaded with a binder in a mortar to produce a paste sample. The paste sample is then spread on a slide glass free of flaws and stains, to prepare a sample cell including a kneaded film having a uniform thickness. The sample cell is immediately placed in a particle size distribution measuring apparatus before agglomeration of the powder particles proceeds in the kneaded film. In the particle size distribution measuring apparatus, the sample cell is irradiated with a laser beam emitted from a laser light source and scanned at a high speed. Changes in the intensity of the laser beam that has passed through the sample cell are detected, and based on the detection results, the particle size distribution of the particles dispersed in the sample cell is measured. This particle size distribution measurement can be performed using a particle size distribution measuring apparatus (GALAI CIS-1) from Galai Inc., for example. Using this type of particle size distribution measuring apparatus, the particle size can be directly determined from the time required for the laser beam to pass over a particle, utilizing the fact that the transmitted light amount decreases when the laser beam is blocked by the particle during the high-speed scanning.

Although the present invention was described as being applied to a rapidly solidified alloy produced by a strip casting method, it is also applicable to an alloy produced by an ingot method. The effect of the present invention is also exhibited for this alloy since R-rich super-fine powder is also formed in the case of using this alloy.

In the above description, a single type of material alloy having the same composition was used for the first and second pulverization processes. The present invention is not limited to this, but plural types of rare earth alloys different in production method and rare earth content may be used as the material to be pulverized. In other words, the present invention is also applicable to the "two-alloy method" where two types of rare earth alloy powder different in composition are mixed, and the mixed powder is compacted and sintered. Specifically, in the "two-alloy method", the first pulverization process may be performed separately for two types of rare earth alloys different in rare earth content. The resultant two types of coarsely pulverized powder may be mixed, and then subjected to the second pulverization process. Alternatively, both the first and second pulverization processes may be performed separately for plural types of rare earth alloys different in rare earth content. Then, the resultant plural types of finely pulverized powder may be mixed together. As yet another method, the present invention may be applied to one of two types of alloys, while a conventional method being applied to the other type of alloy, and the resultant two types of finely pulverized powder may be mixed together.

The composition of the powder changes in the course of the pulverization process. Therefore, in order to appropriately mix plural types of powder different in composition and thereby adjust the composition of the mixed powder to a target value with high precision, it is preferable to measure the composition of the powder after completion of all the pulverization processes and determine the mixture ratio based on the measured value. In this case, plural types of powder may be mixed at the stage of adding a lubricant to the powder.

Thus, in the alloy powder for R—Fe—B type rare earth magnets according to the present invention, the percentage of a powder component that has a particle size of 1 μm or less and is high in oxidation reactivity in the entire powder is small. Therefore, it is possible to prevent the magnet properties from deteriorating due to oxidation of the rare earth element R. This greatly improves the properties of high-performance rare earth magnets, and also improves the safety during manufacture of the magnets.

The present invention exhibits significant effects especially when a rapidly solidified alloy (for example, a strip cast alloy) that is apt to generate R-rich super-fine powder is used and when the hydrogen pulverization process is performed.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A method for manufacturing alloy powder for R—Fe—B rare earth magnets, comprising a first pulverization step of coarsely pulverizing an R—Fe—B alloy for rare earth magnets produced by a rapid cooling method and a second pulverization step of finely pulverizing the material alloy, wherein said second pulverization step comprises a step of removing at least part of the powder in which the concentration of rare earth element is greater than the average concentration of rare earth element contained in the entire powder.

2. The method of claim 1, said second pulverization step including a step of finely pulverizing the alloy using a high-speed flow of a gas.

3. The method of claim 2, wherein the gas comprises oxygen.

4. The method of claim 3, wherein the concentration of oxygen is adjusted to be in the range between 0.05% and 3% by volume.

5. The method of claim 1, further comprising the step of producing the R—Fe—B alloy for rare earth magnets by cooling a molten material alloy at a cooling rate in a range between $10^{2}$° C./sec and $10^{4}$° C./sec.

6. The method of claim 5, wherein the molten material alloy is cooled by a strip casting method.

7. The method of claim 1, wherein the average particle size of the powder obtained in said first pulverization step is 500 $\mu$m or less.

8. The method of claim 1, wherein the average particle size of the powder obtained in said second pulverization step is in a range between 2 $\mu$m and 10 $\mu$m.

9. The method of claim 1, further comprising the step of adding a lubricant to the powder obtained in said second pulverization step.

10. A method for manufacturing an R—Fe—B rare earth magnet comprising the steps of:

preparing alloy powder for R—Fe—B rare earth magnets using the method of claim 1; and compacting the alloy powder for R—Fe—B rare earth magnets to produce a permanent magnet.

11. A method for manufacturing an R—FE—B rare earth magnet comprising the steps of:

preparing first alloy powder for R—Fe—B rare earth magnets using the method of claim 1;

preparing second alloy powder for R—Fe—B rare earth magnets different from the first alloy powder in rare earth content;

mixing the first alloy powder and the second alloy powder, forming mixed powder;

compacting the mixed powder to produce a compact; and sintering the compact to produce a permanent magnet.

* * * * *